US010266956B1

(12) United States Patent
Huang

(10) Patent No.: US 10,266,956 B1
(45) Date of Patent: Apr. 23, 2019

(54) METHOD FOR MANUFACTURING ELECTRO-CATALYTIC HONEYCOMB FOR CONTROLLING EXHAUST EMISSIONS

(71) Applicant: JM International Patent Company, Taipei (TW)

(72) Inventor: Ta-Jen Huang, Hsinchu (TW)

(73) Assignee: JM INTERNATIONAL PATENT COMPANY, Taipei (TW)

( * ) Notice: Subject to any disclaimer, the term of this patent is extended or adjusted under 35 U.S.C. 154(b) by 0 days.

(21) Appl. No.: 16/040,933

(22) Filed: Jul. 20, 2018

(51) Int. Cl.
*B01J 23/42* (2006.01)
*B01J 23/44* (2006.01)
*C25B 11/03* (2006.01)
*B01D 53/32* (2006.01)
*B01D 53/94* (2006.01)
*B01D 53/86* (2006.01)
*C25B 11/04* (2006.01)
*F01N 3/28* (2006.01)

(52) U.S. Cl.
CPC .......... *C25B 11/035* (2013.01); *B01D 53/326* (2013.01); *B01D 53/8631* (2013.01); *B01D 53/8653* (2013.01); *B01D 53/9422* (2013.01); *B01D 53/9454* (2013.01); *C25B 11/0405* (2013.01); *C25B 11/0415* (2013.01); *C25B 11/0478* (2013.01); *F01N 3/2828* (2013.01); *B01D 2255/806* (2013.01); *F01N 2330/06* (2013.01); *F01N 2370/02* (2013.01)

(58) Field of Classification Search
CPC .............. C25B 11/035; C25B 11/0405; C25B 11/0478; C25B 11/0415; B01D 53/326; B01D 53/9422; B01D 53/8631; B01D 53/9454; B01D 53/8653; B01D 2255/806; F01N 3/2828; F01N 2330/06; F01N 2370/02
See application file for complete search history.

(56) References Cited

U.S. PATENT DOCUMENTS

| | | | |
|---|---|---|---|
| 5,401,372 A | 3/1995 | Liu et al. | |
| 9,028,764 B2 | 5/2015 | Huang | |
| 2013/0112552 A1* | 5/2013 | Huang | B01D 53/326 204/290.03 |
| 2014/0120003 A1* | 5/2014 | Huang | B01D 53/8625 422/180 |

FOREIGN PATENT DOCUMENTS

TW  I572406 B  3/2017

* cited by examiner

*Primary Examiner* — Haytham Soliman
(74) *Attorney, Agent, or Firm* — Muncy, Geissler, Olds & Lowe, P.C.

(57) ABSTRACT

The present invention provides a method for manufacturing an electro-catalytic honeycomb for controlling exhaust emissions, comprising steps of: providing a honeycomb structural frame including an outer surface, a plurality of airflow channels and a plurality of partition walls, and contacting the outer surface of the honeycomb structural frame with a molten metal to attach the molten metal in the plurality of partition walls to form a reducing environment. Accordingly, through the reducing environment in the partition wall and the oxidizing environment of a lean-burn exhaust contacted by a cathode, the electro-catalytic honeycomb generates an electromotive force between the partition wall and the cathode to drive the nitrogen oxides in the lean-burn exhaust to decompose at the cathode in order to control exhaust emissions.

10 Claims, 9 Drawing Sheets

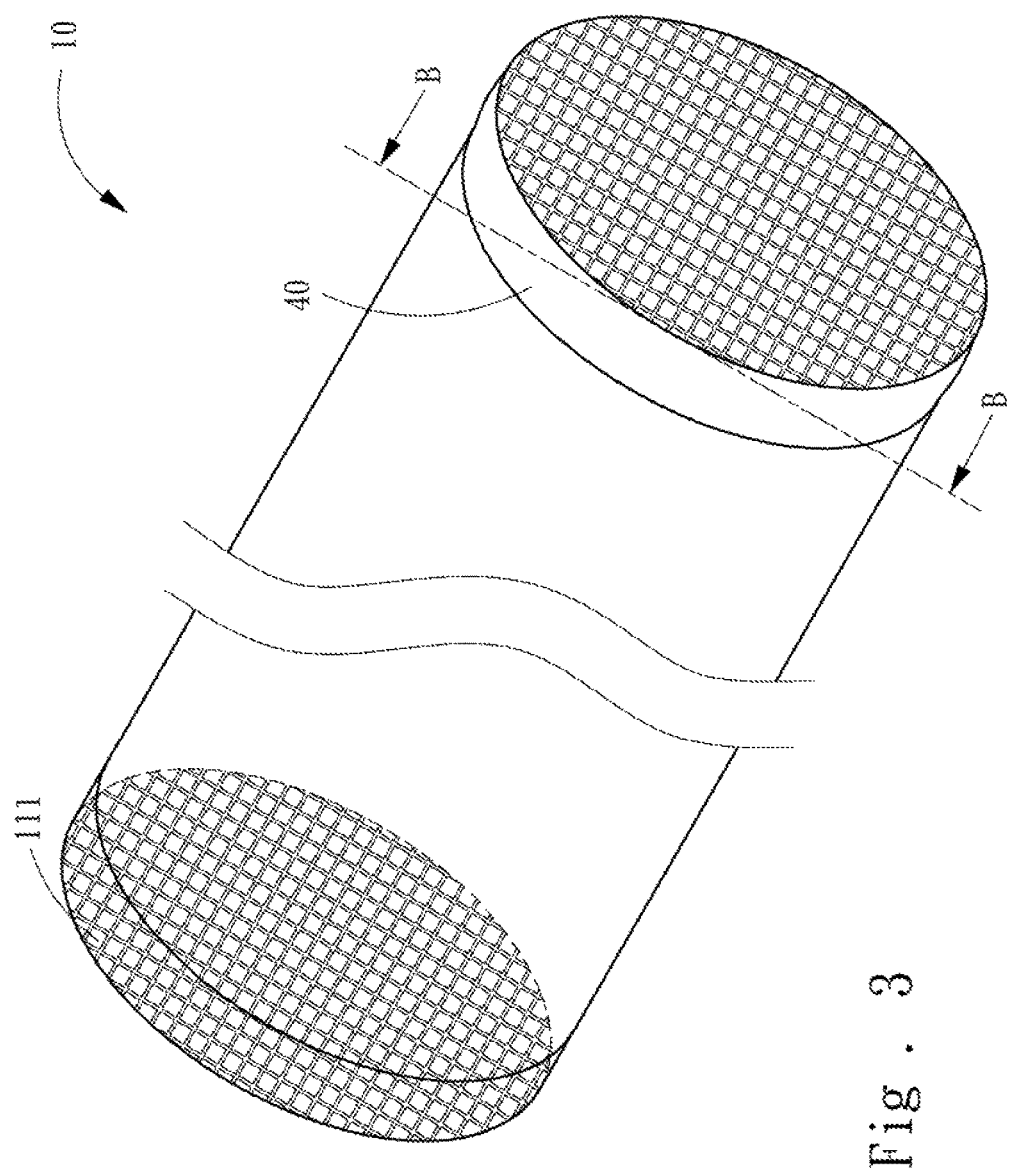

METHOD FOR MANUFACTURING ELECTRO-CATALYTIC HONEYCOMB FOR CONTROLLING EXHAUST EMISSIONS

FIELD OF THE INVENTION

The present invention relates to a method for manufacturing a device for controlling exhaust emissions, and more particularly to a method for manufacturing an electro-catalytic honeycomb for controlling exhaust emissions.

BACKGROUND OF THE INVENTION

Air pollution has a huge impact on health. Studies have pointed out that exhaust gas, soot and dust emitted from fuel combustion during the production process in various types of factories and thermal power plants, the exhaust gas emitted by vehicles such as automobiles, motorbikes, airplanes, trains and ships, and the fumes produced by various human activities are the causes of current air pollution.

Take the vehicle as an example, during the operation of the vehicle engine, different forms of fuel release heat energy via internal combustion in the cylinder, thereby generating transmission power. However, in the combustion process, the generated exhaust gas contains harmful pollutants such as nitrogen oxides (NOx), carbon monoxide (CO), hydrocarbons (HCs) and particulate matter (PM). Therefore, the harmful pollutants not only form photochemical smog, but also exacerbate the deterioration of the greenhouse effect and causes negative effects such as acid rain, destroying the ecological environment and also harming human health.

Therefore, many countries have already set strict exhaust emission standards to control and reduce the emission of harmful gases. At the same time, they encourage companies to manufacture, develop, and introduce products that use the latest pollution control technologies. For example, the U.S. Pat. No. 5,401,372 discloses an "Electrochemical catalytic reduction cell for the reduction of NOx in an $O_2$-containing exhaust emission", which catalyzes the conversion of nitrogen oxides into nitrogen with vanadium pentoxide ($V_2O_5$) catalyst under an electrochemical catalyst reduction reaction. However, the device must be additionally supplied with a power source to operate an electrochemical cell in the device.

In order to solve the above drawbacks, the inventor of the present application proposed the U.S. Pat. No. 9,028,764B2, it discloses an "Electro-Catalytic Honeycomb for Exhaust Emissions Control" including an electro-catalytic honeycomb for controlling exhaust emissions. The electro-catalytic honeycomb is used for purifying nitrogen oxides, carbon monoxide, hydrocarbons and particulate matter in exhaust gas, wherein the nitrogen oxides are decomposed into nitrogen and oxygen, and the carbon monoxide, the hydrocarbons, and the particulate matter are oxidized into carbon dioxide and water. The electro-catalyst honeycomb for exhaust emissions control purifies a variety of pollutants without consuming additional energy and reducing gases.

Since the above-mentioned electro-catalytic honeycomb for exhaust emissions control is manufactured in a way that both the cathode and the anode are exposed to the open space, it is difficult to reduce the anode to form a reducing environment, and there is still room for improvement. Therefore, the inventor of the present invention and one other inventor proposed the Taiwan Patent No. I572406 "An Electro-catalytic Honeycomb for Exhaust Emissions Control and Manufacturing Method Thereof", which provides a method for improvement by using the sealing body to separate the cathode and the anode before reducing the anode so that subsequent steps are performed and the anode is sufficiently reduced.

However, the above method still has the problem of difficulty in the manufacturing process, which is because it takes a lot of time to form a sufficient reducing environment by sufficiently reducing a metal oxide in the anode to become a metal. Therefore, the production time is longer, and problem with yield rate may occur in the electro-catalytic honeycomb depending on the degree of incomplete reduction or uneven reduction.

SUMMARY OF THE INVENTION

A main object of the present invention is to improve the drawback that the conventional electro-catalytic honeycombs for controlling exhaust emissions need a lot of time for the sufficient reduction of the anode in the manufacturing process, which is unfavorable to mass production.

In order to achieve the above object, the present invention provides a method for manufacturing an electro-catalytic honeycomb for controlling exhaust emissions, the manufacturing method comprising following steps of:

In Step (S1), the present invention provides a honeycomb structural frame. The honeycomb structural frame includes an outer surface, a plurality of airflow channels, and a plurality of partition walls disposed between two adjacent airflow channels. The honeycomb structural frame is formed with a first porous structure and made of a ceramic material. Each of the plurality of partition walls includes an inner surface located inside each of the plurality of airflow channels.

In Step (S2) and Step (S3), a solid oxide layer is formed with a first dense structure on the inner surfaces and a cathode layer is formed with a second porous structure on the solid oxide layer.

In Step (S4), two end sides of the plurality of airflow channels are covered and sealed by a sealing body so that the plurality of airflow channels become closed spaces. Furthermore, the honeycomb structural frame is contacted with a molten metal and the molten metal enters into the plurality of partition walls via the first porous structure of the honeycomb structural frame. Thus, the molten metal attaches in the plurality of partition walls to form a reducing environment.

The prior art electro-catalytic honeycomb is manufactured by attaching a metal oxide in the partition wall and then reducing the metal oxide. Since the metal oxide needs to be fully reduced in order to generate the full reducing environment, and full reduction requires a large amount of time. Therefore, the production time is longer, and problem with yield rate may occur in the electro-catalytic honeycomb depending on the degree of incomplete reduction or uneven reduction. In contrast, the present invention proposes the method in which, the honeycomb structural frame is contacted with the metal in the molten state so that the metal in the molten state is attached in the partition wall to immediately form the sufficient reducing environment, which is equivalent to the metal oxide of the prior art electro-catalytic honeycomb being 100% fully reduced to the metal. Accordingly, the present invention eliminates the considerably time-consuming step of reducing the metal oxide in the prior art, and is more capable of ensuring the integrity of the reducing environment than the prior art. That is, the present invention provides a more time-saving and efficient manufacturing method of the electro-catalytic honeycomb.

BRIEF DESCRIPTION OF THE DRAWINGS

FIG. 3 is an appearance diagram of a honeycomb structural frame according to one embodiment of the present invention;

DETAILED DESCRIPTION OF THE PREFERRED EMBODIMENTS

The detailed description and technical content of the present invention will be explained as follows in conjunction with the drawings.

One embodiment of the present invention provides a method for manufacturing an electro-catalytic honeycomb for controlling exhaust emissions, comprising steps (S1) to (S5).

Figure 1:
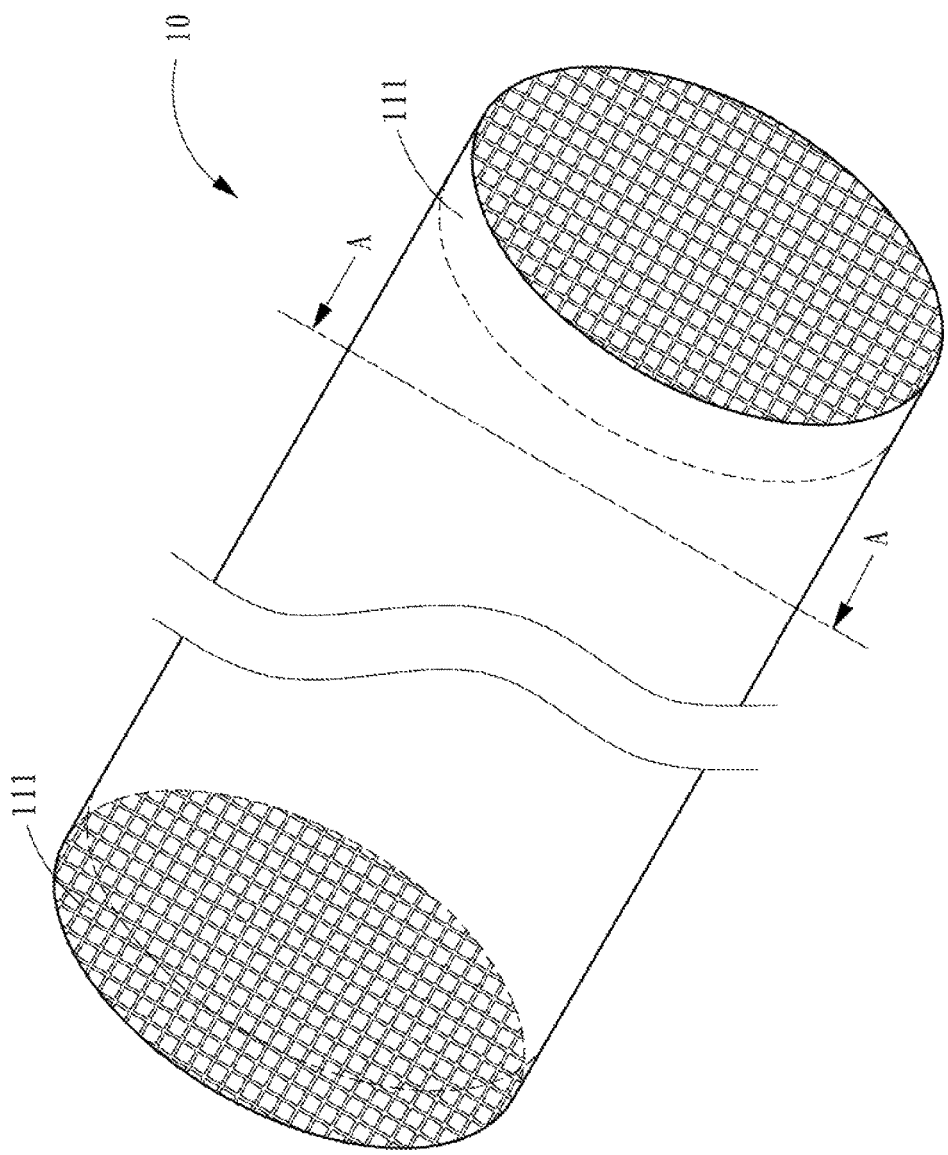
FIG. 1 is an appearance diagram of a honeycomb structural frame according to one embodiment of the present invention.
Figure 2B:
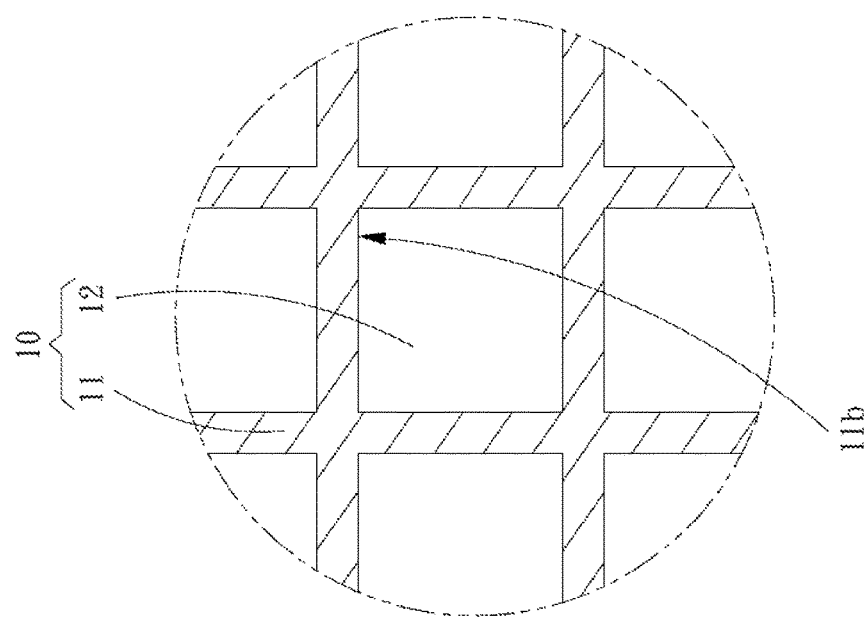
FIG. 2B is an enlarged partial view of FIG. 2A.
Figure 2A:
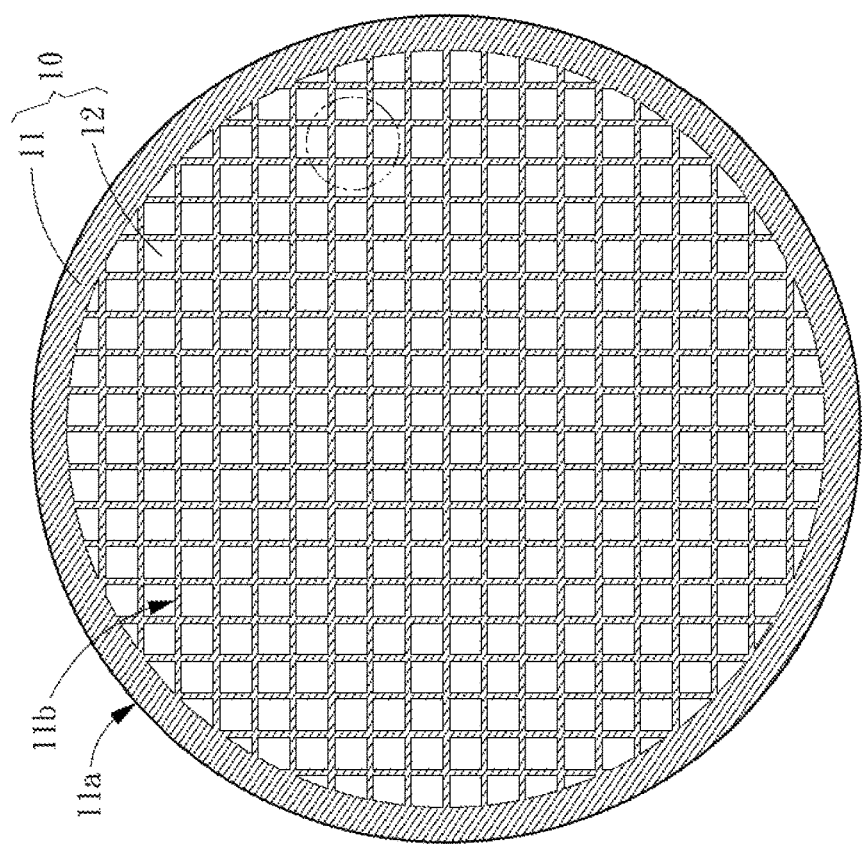
FIG. 2A is an A-A cross-sectional diagram of FIG. 1.

Please refer to FIG. 1, FIG. 2A and FIG. 2B, which are sequentially a schematic view of a honeycomb structural frame according to one embodiment of the present invention, an A-A cross-sectional view of FIG. 1 and a partial enlarged view of FIG. 2A. In Step (S1), a honeycomb structural frame 10 formed with a first porous structure and made of a ceramic material is provided. The honeycomb structural frame 10 comprises a plurality of airflow channels 12, a plurality of partition walls 11, and an outer surface 11a. The ceramic material is selected from the group consisted of cordierite, kaolin, perovskite structure metal oxides, fluorite structure metal oxides, and combinations thereof.

Each of the plurality of partition walls 11 is formed around each of the plurality of airflow channels 12 and includes an inner surface 11b. The outer surface 11a is the outermost surface of the honeycomb structural frame 10, and the inner surfaces 11b are disposed between the plurality of airflow channels 12.

Figure 4B:
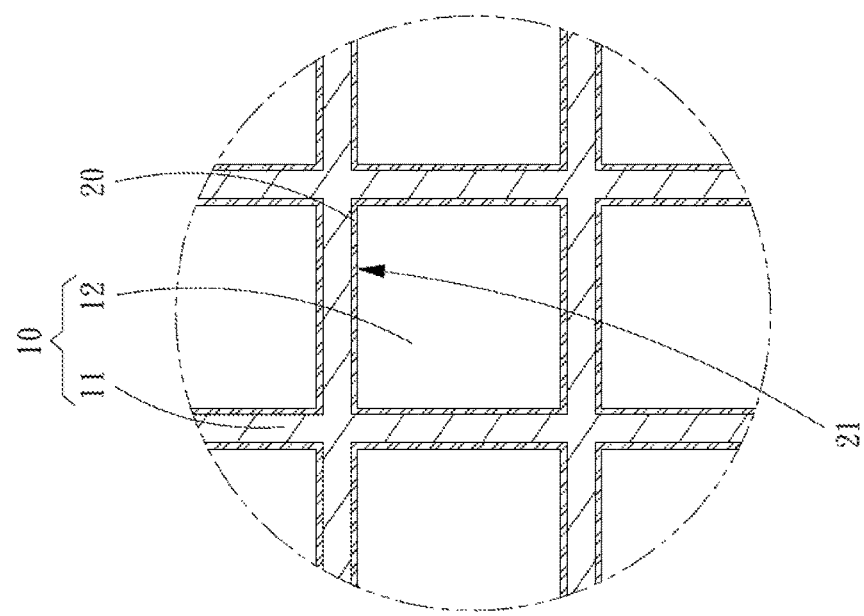
FIG. 4B is an enlarged partial view of FIG. 4A.
Figure 4A:
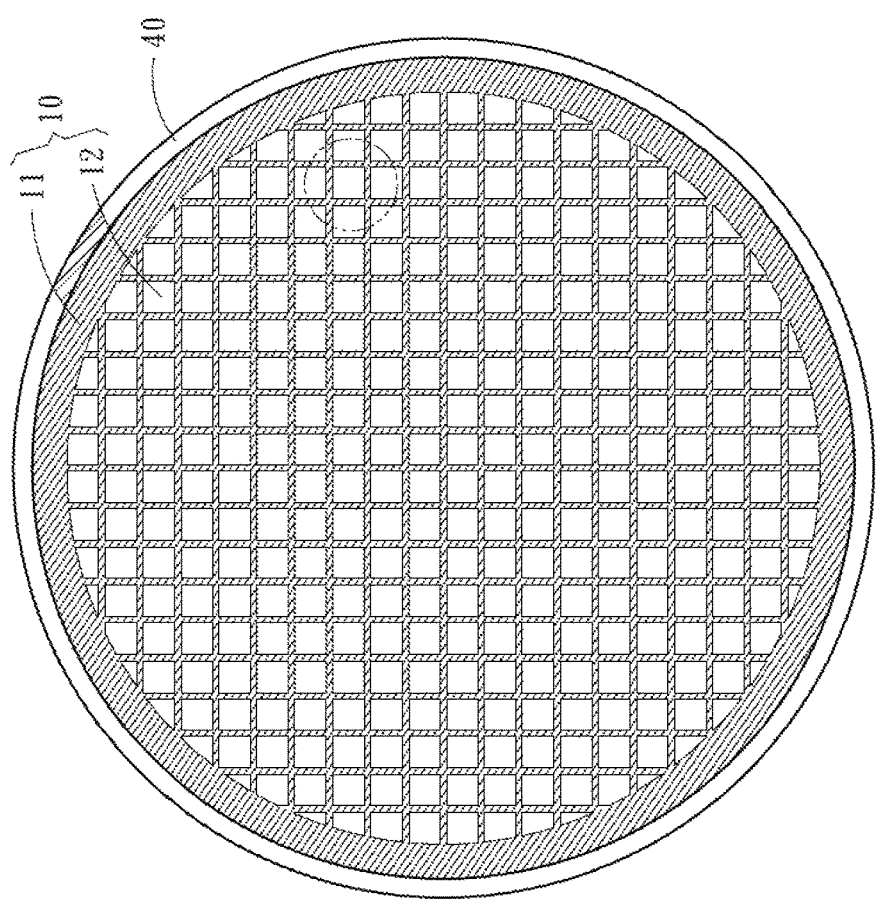
FIG. 4A is a B-B cross-sectional diagram of FIG. 3.

Please refer to FIG. 3, FIG. 4A, and FIG. 4B, which are sequentially a schematic view of the honeycomb structural frame, a B-B cross-sectional view of FIG. 3 and a partial enlarged view of FIG. 4A. In Step (S2), a solid oxide layer 20 is formed on the inner surfaces 11b of the plurality of partition walls 11. In addition to the inner surfaces 11b of the plurality of partition walls 11, the solid oxide layer 20 is also formed on the two opposite ends of the honeycomb structural frame 10 and part of the outer surface 11a. Thus, the solid oxide layer 20 completely covers the inner surfaces 11b of the plurality of partition walls 11. The "part of the outer surface 11a" is an annular end edge 111 of the outer surface 11a, and an inner ring layer 40 is formed on the annular end edge 111.

The solid oxide layer 20 is a first dense structure. In one embodiment, the material of the solid oxide layer 20 is selected from a group consisted of fluorite structure metal oxides, perovskite structure metal oxides and combinations thereof. For example, the material of the solid oxide layer is Yttria-Stabilized Zirconia (YSZ), Stabilized-Zirconia, Gadolinia-Doped Ceria (GDC), doped Ceria, Strontium/Magnesium-doped Lanthanum Gallate (LSGM), or doped Lanthanum Gallate.

Furthermore, the solid oxide layer 20 may be formed by applying a paste of the solid oxide layer 20 to the annular end edge 111 of the outer surface 11a, the end surfaces of the opposite ends of the honeycomb structural frame 10 and the inner surfaces 11b before the solid oxide layer 20 is sintered.

Figure 5:
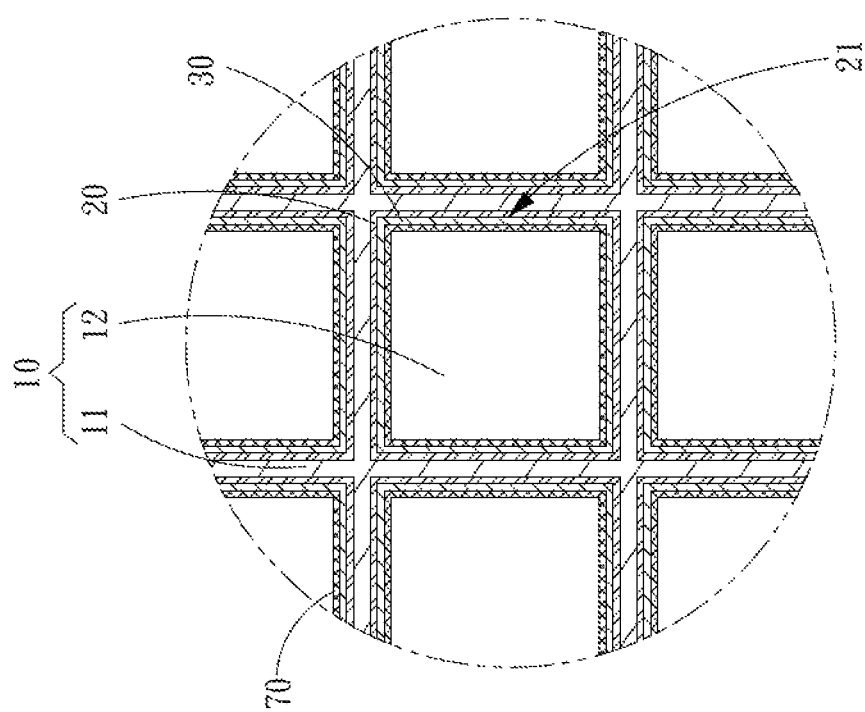
FIG. 5 is a schematic diagram showing the formation of a cathode layer according to one embodiment of the present invention.

Please refer to FIG. 5. In Step (S3), a cathode layer 30 is formed on a wall 21 of the solid oxide layer 20 which is facing the plurality of airflow channel 12. Further, the cathode layer 30 is a second porous structure. In one embodiment, the material of the cathode layer 30 is selected from a group consisted of perovskite structure metal oxides, fluorite structure metal oxides, metal-added perovskite structure metal oxides, and metal-added fluorite structure metal oxides, and combinations thereof. For example, the material of the cathode layer 30 is lanthanum strontium cobalt oxides of perovskite structure, lanthanum strontium manganese oxides, a combination of lanthanum strontium cobalt oxides and GDC, a combination of lanthanum strontium manganese oxides and GDC, a combination of lanthanum strontium cobalt oxides and YSZ, or a combination of lanthanum strontium manganese oxides and YSZ.

In one embodiment, on a side of the cathode layer 30 closed to the plurality of airflow channels 12 further includes an oxidation catalyst layer 70 to promote oxidation of components in the exhaust gas that are not prone to oxidation of the cathode layer 30. The oxidation catalyst layer 70 is in contact with the cathode layer 30 and attached on the cathode layer 30. The material of the oxidation catalyst layer 70 is selected from the group consisted of metals, alloys, metal oxides, fluorite structure metal oxides, perovskite structure metal oxides, and combinations thereof. For example, the material of the oxidation catalyst layer 70 is palladium, gadolinia-doped ceria (GDC) of fluorite structure, or lanthanum strontium manganese oxides.

Figure 6:
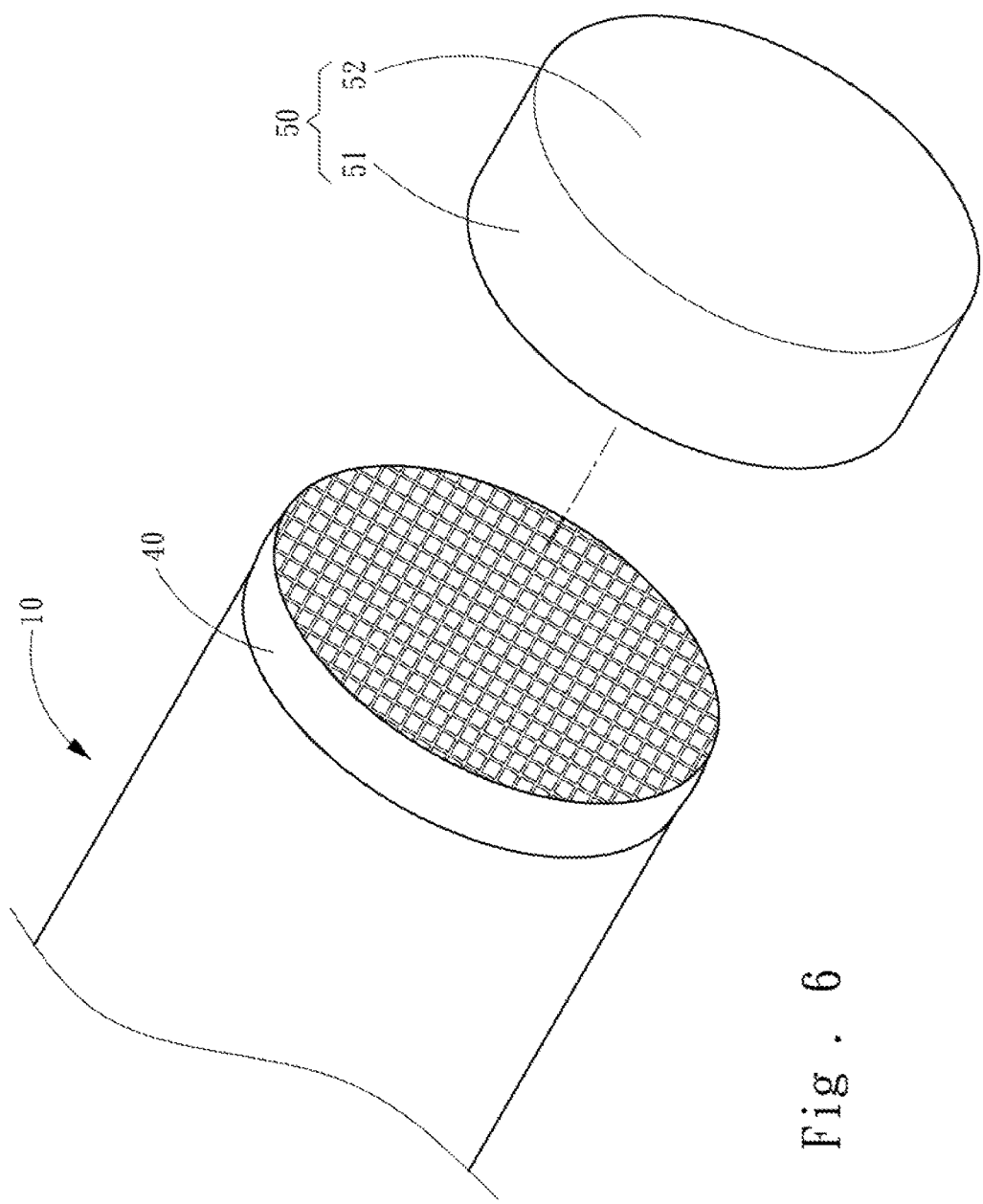
FIG. 6 is a schematic diagram showing a honeycomb structural frame with a sealing body according to one embodiment of the present invention.
Figure 7:
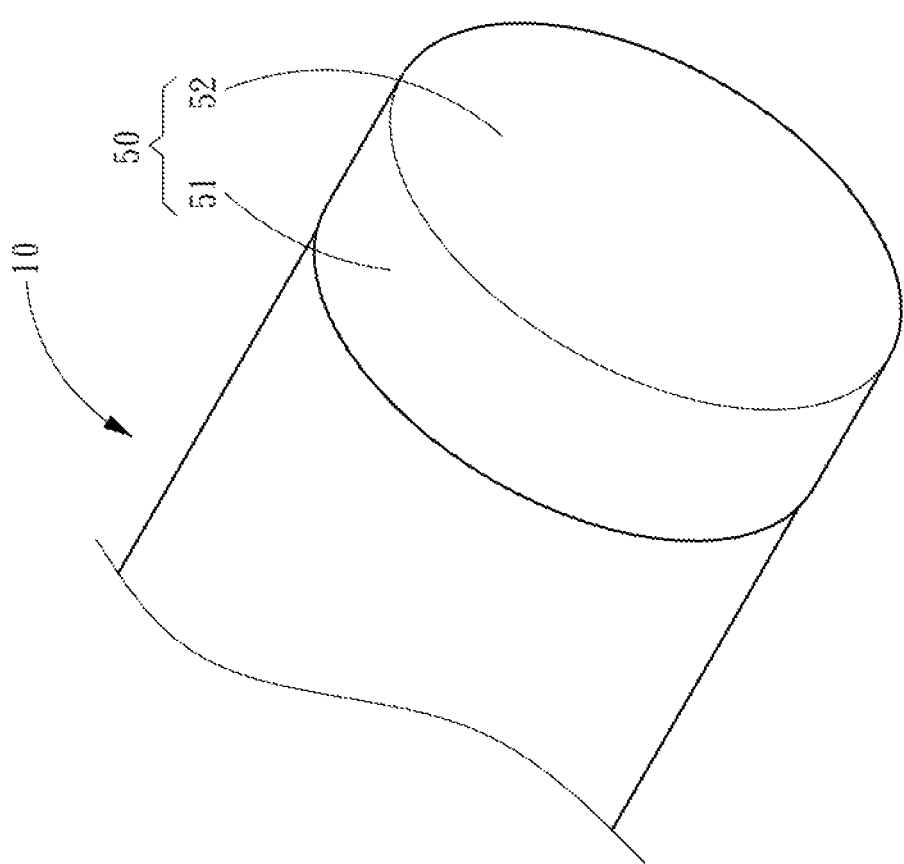
FIG. 7 is a schematic diagram showing a honeycomb structural frame sleeved by a sealing body according to one embodiment of the present invention.

In one embodiment, the inner ring layer 40 is further sleeved by a sealing body 50 to enhance the sealing effect. Please refer to FIG. 6 and FIG. 7, the sealing body 50 comprises a hollow outer ring 51 and a sealing film 52. The sealing body 50 is sleeved on the inner ring layer 40 to seal the openings of the end sides of the plurality of airflow channels 12, causing the plurality of airflow channels 12 to become closed spaces. For example, a first sealing layer with a dense structure is formed on the inner ring layer 40, and then the sealing body 50 is further disposed on the first sealing layer. Alternatively, the hollow outer ring 51 is disposed on the first sealing layer, and then the sealing film 52 is disposed on an outer edge of the hollow outer ring 51. Further, the materials of the hollow outer ring 51, the sealing film 52 and the first sealing layer are selected independently from the group consisted of a metal, an alloy, a glass, and a ceramic. For example, the sealing film 52 may be a graphite sheet which seals the end sides of the plurality of airflow channels 12 after being pressurized. In one embodiment, "pressurizing" refers to the graphite sheet is pressed against the aforesaid end sides by a metal plate. The graphite sheet is added on both the end sides of the plurality of airflow channels 12 and pressurized to make the plurality of airflow channels 12 become sealed spaces. In one embodiment, the sealing body 50 is merely the sealing film 52 of the graphite sheet pressed by the metal plate.

Figure 8:
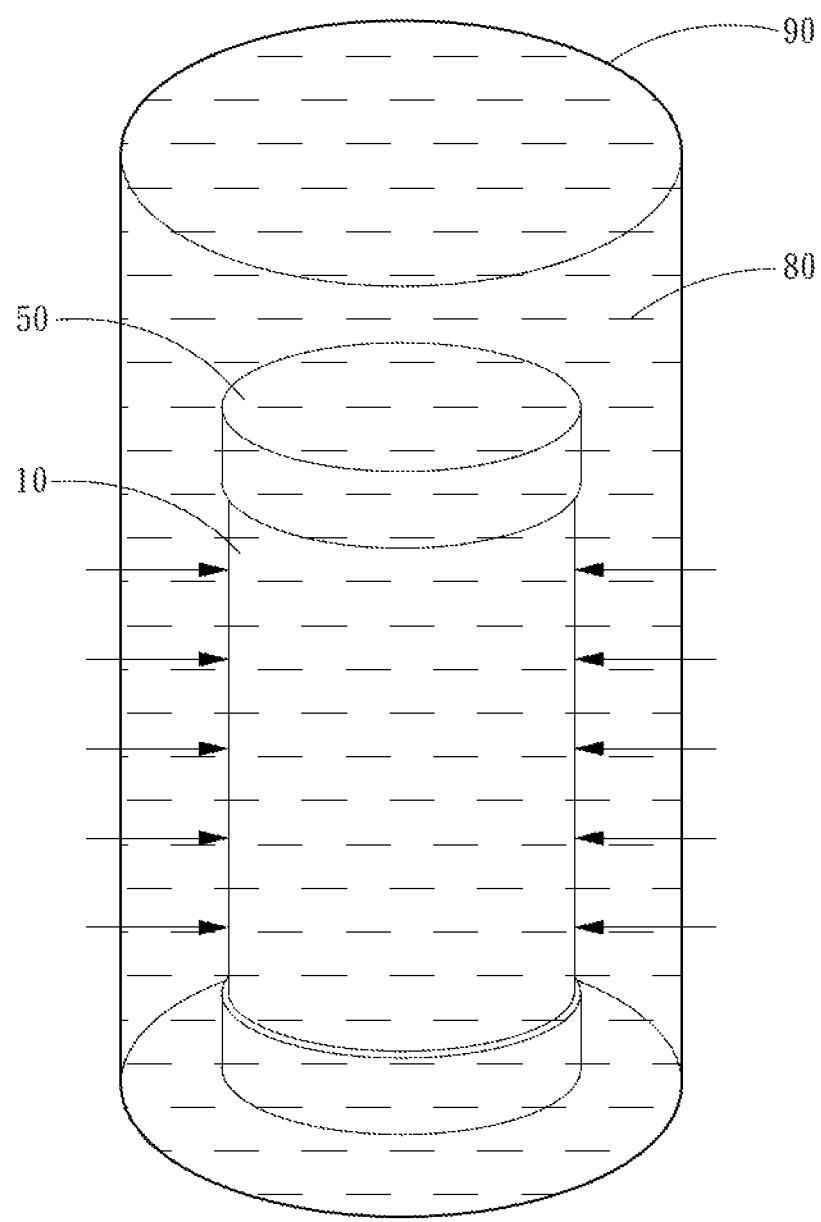
FIG. 8 is a schematic diagram of the manufacturing method according to one embodiment of the present invention.

In step (S4), after the plurality of airflow channels 12 became closed spaces, the honeycomb structural frame 10 is contacted with a molten metal 80 to cause the plurality of partition walls 11 to attach with the molten metal 80 and form a reducing environment. Please refer to FIG. 8, in another embodiment, the honeycomb structure frame 10 is soaked in a container 90 containing the molten metal 80. The molten metal 80 flows according to the direction indicated by the arrows and enters into the plurality of partition walls 11 through the first porous structure of the honeycomb structure frame 10. Therefore, the first porous structure of the plurality of partition walls 11 is attached with the molten metal 80 in the molten state. Further, in one embodiment, the sealing body 50 covers and seals the openings at the two end sides of the plurality of airflow channels 12, so that the molten metal 80 cannot enter into the plurality of airflow channels 12 of the honeycomb structure frame 10 through the openings at the two end sides of the plurality of airflow channels 12. Therefore, the plurality of airflow channels 12 are prevented from being blocked so that the honeycomb structural frame 10 may not lose the function of passing the exhaust gas for treatment. In one embodiment, the portion of the outer surface 11a of the honeycomb structural frame 10 is subjected to a high-temperature calcination during the production process to generate a surface layer with a porosity lower than the interior so that the speed of the molten metal 80 transporting through the outer surface 11a into the first porous structure is adversely affected. Therefore, the surface layer of the outer surface 11a is mechanically removed first, for example, to scrape off the surface layer with a steel brush, to facilitate the molten metal 80 transporting into the first porous structure of the plurality of partition walls 11.

In the present invention, the metal used in the molten metal 80 is a metal employed in a metal-air battery. In one embodiment, the metal is selected from the group consisted of zinc metal, magnesium metal, aluminum metal, lithium metal and tin metal, and combinations thereof.

Specifically, the molten metal 80 is formed by heating the metal to meet the melting point temperature so that the metal is formed into a liquid state with fluidity to be able to transport into the first porous structure. In another embodiment, the molten metal 80 is zinc metal, which has a melting point temperature of 420° C.

Figure 9:
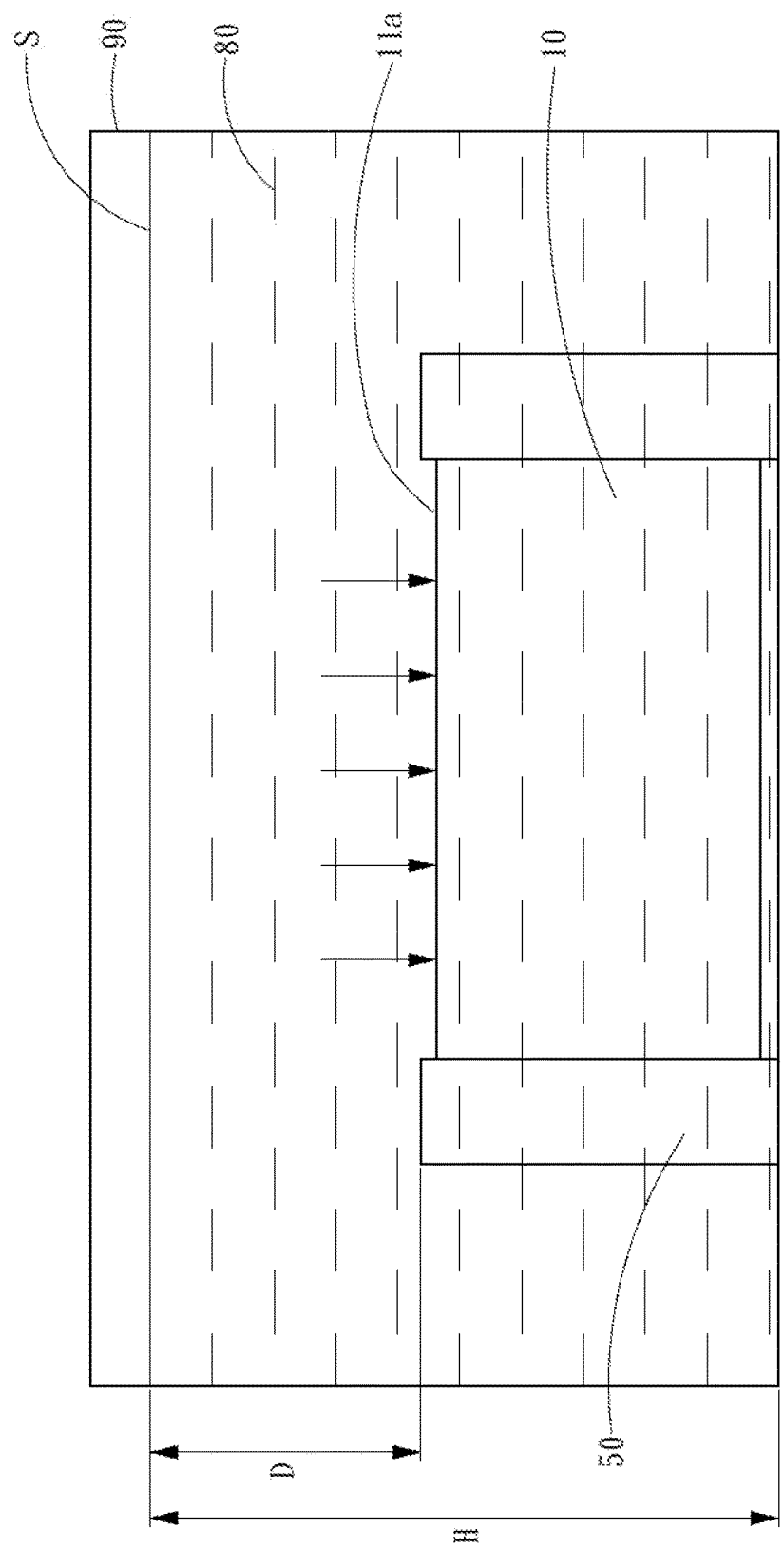
FIG. 9 is a schematic diagram of the manufacturing method according to another embodiment of the present invention.

In another embodiment, before contacting the honeycomb structural frame 10 with the molten metal 80, the first porous structure of the honeycomb structural frame 10 is evacuated into a vacuum to reduce or eliminate the resistance caused by the outgoing gas, if any, when the molten metal 80 transports into the first porous structure. Please refer to FIG. 9 for another embodiment, a height H of a liquid surface S of the molten metal 80 in the container 90 is increased and a depth D of the outer surface 11a of the honeycomb structural frame 10 in the container 90 relative to the liquid surface S of the molten metal 80 is increased. The honeycomb structural frame 10 is horizontally placed at a bottom of the container 90, the weight of the molten metal 80 under the liquid surface S and over the outer surface 11a increases with increasing depth D and thus the pressure of the molten metal 80 applied to the outer surface 11a increases so that the speed of the molten metal 80 transporting into the first porous structure increases.

In another embodiment, when the honeycomb structural frame 10 is taken out of the container 90 and contacts with a gas with a temperature lower than the melting point temperature of the molten metal 80, the molten metal 80 solidifies on the part of the outer surface 11a to prevent the molten metal 80 from flowing out of the honeycomb structural frame 10. Furthermore, before removing the honeycomb structural frame 10 from the container 90, a non-oxidizing gas is added to the space above the liquid surface S of the container 90, and the pressure of the non-oxidizing gas is higher than the atmospheric pressure, more specifically, it will be better if the higher pressure of the non-oxidizing gas is added, so as to prevent the molten metal 80 from flowing out through the first porous structure when the honeycomb structural frame 10 is taken out into the space above the liquid surface and also increase the solidifying efficiency of the molten metal 80 on the outer surface 11a. In another embodiment, when the honeycomb structural frame 10 is in the container 90 containing the molten metal 80, the pressure of the non-oxidizing gas can be increased to increase the pressure of the molten metal 80 on the outer surface 11a so as to increase the speed of the molten metal 80 transporting into the first porous structure.

Then, in step (S5), the molten metal 80 solidifies and attaches in the plurality of partition walls 11 through the first porous structure of the honeycomb structure frame 10 so as to form a reducing environment in the plurality of partition walls 11. That is, no other step is required to form the reducing environment in the plurality of partition walls 11. Then, for example, after the molten metal 80 is solidified, an outer shell is disposed on the outer surface 11a of the honeycomb structural frame 10. The outer shell and the solid oxide layer 20 are joined to seal the reducing environment in the plurality of partition walls 11. Then, remove the sealing film 52 that is sealed at both the end sides of the plurality of airflow channels 12. Therefore, the plurality of airflow channels 12 are provided for the flowing of a lean-burn exhaust. In one embodiment, the outer shell is formed by applying an inorganic glue.

What is claimed is:

1. A method for manufacturing an electro-catalytic honeycomb for controlling exhaust emissions, comprising following steps of:

providing a honeycomb structural frame, the honeycomb structural frame including an outer surface, a plurality of airflow channels, and a plurality of partition walls disposed between two adjacent airflow channels, wherein the honeycomb structural frame with a first porous structure is made of a ceramic material, and each of the plurality of partition walls includes an inner surface located inside one of the plurality of airflow channels;

forming a solid oxide layer with a first dense structure on the inner surfaces and forming a cathode layer disposed with a second porous structure on the solid oxide layer;

sealing two end sides of the plurality of airflow channels and the plurality of airflow channels becoming closed spaces; and contacting the honeycomb structural frame with a molten metal to transport the molten metal into the first porous structure of the plurality of partition walls via the outer surface and to make the molten metal attach in the plurality of partition walls to form a reducing environment.

2. The method for manufacturing an electro-catalytic honeycomb for controlling exhaust emissions according to claim 1, wherein the ceramic material of the honeycomb structural frame is selected from a group consisting of cordierite, kaolin, perovskite structure metal oxides, fluorite structure metal oxides, and combinations thereof.

3. The method for manufacturing an electro-catalytic honeycomb for controlling exhaust emissions according to claim 1, wherein the material of the solid oxide layer is selected from a group consisting of fluorite structure metal oxides, perovskite structure metal oxides and combinations thereof.

4. The method for manufacturing an electro-catalytic honeycomb for controlling exhaust emissions according to claim 1, wherein the material of the cathode layer is selected from a group consisting of perovskite structure metal oxides, fluorite structure metal oxides, metal-added perovskite structure metal oxides, metal-added fluorite structure metal oxides, and combinations thereof.

5. The method for manufacturing an electro-catalytic honeycomb for controlling exhaust emissions according to claim 1, wherein the molten metal is selected from a group consisting of zinc metal, magnesium metal, aluminum metal, lithium metal, tin metal, and combinations thereof.

6. The method for manufacturing an electro-catalytic honeycomb for controlling exhaust emissions according to claim 1, wherein the molten metal is formed by heating a metal to meet the melting point temperature and transporting the molten metal into the first porous structure in a liquid state with fluidity.

7. The method for manufacturing an electro-catalytic honeycomb for controlling exhaust emissions according to claim 1, prior to contacting the honeycomb structural frame with the molten metal, evacuating the first porous structure of the honeycomb structural frame into a vacuum to eliminate the resistance caused by an outgoing gas when the molten metal transporting into the first porous structure.

8. The method for manufacturing an electro-catalytic honeycomb for controlling exhaust emissions according to claim 1, wherein the honeycomb structural frame is contacted with the molten metal by soaking the honeycomb structural frame in a container containing the molten metal.

9. The method for manufacturing an electro-catalytic honeycomb for controlling exhaust emissions according to claim 8, when taking out the honeycomb structural frame from the container, contacting a gas with a temperature lower than the melting point temperature of the molten metal to solidify the molten metal on the part of the outer surface to prevent the molten metal from flowing out of the honeycomb structural frame.

10. The method for manufacturing an electro-catalytic honeycomb for controlling exhaust emissions according to claim 1, after the molten metal being solidified, disposing an outer shell on the outer surface to join with the solid oxide layer and to seal the reducing environment, and removing a sealing film sealed at both the end sides of the plurality of airflow channels such that the airflow channels are provided for the flowing of a lean-burn exhaust.

\* \* \* \* \*